US007002966B2

(12) United States Patent
Gregg et al.

(10) Patent No.: US 7,002,966 B2
(45) Date of Patent: Feb. 21, 2006

(54) PRIORITY MECHANISM FOR LINK FRAME TRANSMISSION AND RECEPTION

(75) Inventors: Thomas A. Gregg, Highland, NY (US); Kulwant M. Pandey, Lagrangeville, NY (US)

(73) Assignee: International Business Machines Corporation, Armonk, NY (US)

(*) Notice: Subject to any disclaimer, the term of this patent is extended or adjusted under 35 U.S.C. 154(b) by 887 days.

(21) Appl. No.: 09/961,016

(22) Filed: Sep. 21, 2001

(65) Prior Publication Data

US 2003/0061373 A1 Mar. 27, 2003

(51) Int. Cl.
*H04L 12/28* (2006.01)
*H04L 12/56* (2006.01)

(52) U.S. Cl. .................. 370/395.4; 370/444; 370/455; 455/435.3; 709/207; 710/40; 710/44

(58) Field of Classification Search ................ 370/444, 370/454, 455, 468, 395.4, 260; 455/435.3; 709/207; 710/40, 44
See application file for complete search history.

(56) References Cited

U.S. PATENT DOCUMENTS

| | | | | |
|---|---|---|---|---|
| 5,638,369 | A * | 6/1997 | Ayerst et al. | 370/346 |
| 5,812,534 | A * | 9/1998 | Davis et al. | 370/260 |
| 6,081,202 | A * | 6/2000 | Dorenbosch | 340/7.3 |
| 2002/0146022 | A1 * | 10/2002 | Van Doren et al. | 370/412 |

* cited by examiner

*Primary Examiner*—Dang Ton
*Assistant Examiner*—Inder Pal Mehra
(74) *Attorney, Agent, or Firm*—Lynn L. Augspurger

(57) ABSTRACT

A method and system for scheduling multiple frames and packets that are queued for transmission over a link, and queued from a link for storing into main memory. It recognizes priorities, provides fairness, and guarantees forward progress of all users. This method and system provides a mechanism that achieves the objectives with a very small state machine. It takes advantage of the nature of the traffic to calculate priorities in parallel to frame transmission.

2 Claims, 4 Drawing Sheets

SYSTEM 1 102 104 SYSTEM 2
112 OS0 114 OS1 116 OS2 118 CF0 120 CF1
CHANNEL A 106 110 CHANNEL A 108
122 OS0 124 OS1 126 OS2 128 CF0 130 CF1

PRIORITY MECHANISM FOR LINK FRAME TRANSMISSION AND RECEPTION

FIELD OF THE INVENTION

The present invention generally relates to communications between computer systems and, more particularly, to supporting a method and apparatus to send messages between computer systems.

BACKGROUND

In prior art used in IBM's mainframe InterSyetem Channels (ISCs) and Integrated Cluster Bus (ICB) channels, there are only four message buffer sets and this makes queuing frames and packets a quite simple process. Additionally, because these prior design implemented in IBMs S/390 and z Series (trademarks of International Business Machines Corporation) systems use code in multiple data frame transfers, a first-come-first-served algorithm is sufficient. In IBM's newest z Series mainframes, the number of message buffer sets is increased from four to 32. With this much larger number of message buffer sets, the first-come-first-served algorithm becomes much more unfair leading to having some message buffer sets starved for service.

A scheduling mechanism is needed which provides a method useable in a system where multiple frames and packets are queued for transmission over a link and queued from a link for storing into main memory. Such a method has not been created before and is desireable for these IBM machines.

SUMMARY OF THE INVENTION

In accordance with the invention a scheduling method for scheduling the transmission of message frames and packets among coupled computer systems of a complex computer system for sending messages between said coupled computer systems, comprises the steps of said scheduler which:

recognizes priorities of different kinds of messages presented to the scheduling mechanism;

processes the different kinds of messages presented with fairness within a priority; and guarantees the forward progress of all message buffer sets.

In accordance with this invention a hardware state machine scheduler that recognizes priorities among various traffic classes, provides fairness such that equal priorities have equal transmission and storing characteristics, and guarantees forward progress of all users.

This invention provides a method for a complex computer system that achieves the objectives with a very small state machine. This invention takes advantage of the nature of the traffic to calculate priorities in parallel to frame transmission. Because frame transmission requires multiple cycles, the state machine has multiple cycles to perform the calculations required to determine the next user to transmit or store.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
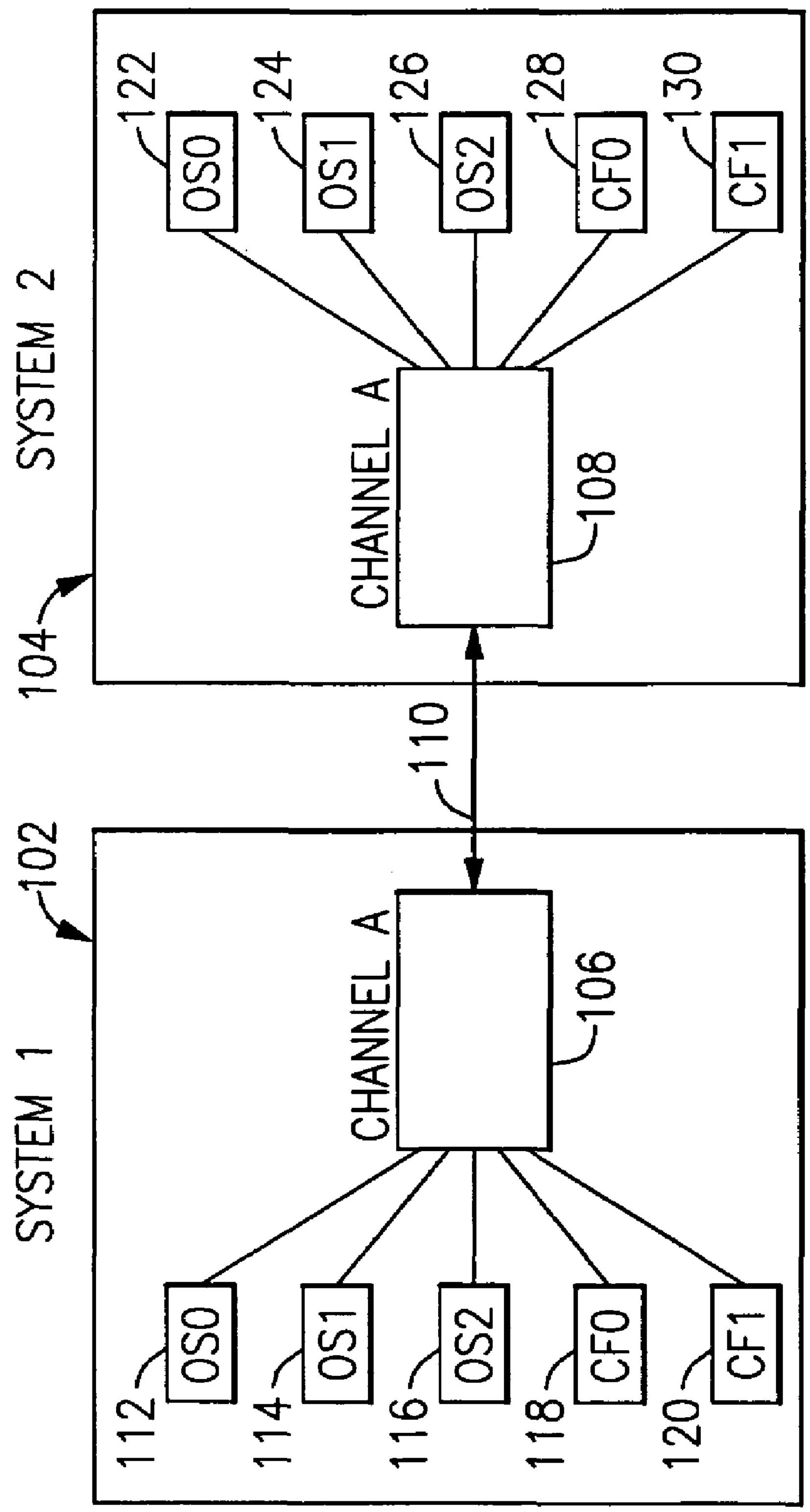
FIG. 1 illustrates two systems connected by an InterSyetem Channel (ISC)

FIG. 1 shows System 1 102 containing Channel A 106 and System 2 104 containing Channel A 108. The channels are connected by link 110. Messages are sent between Operating System (OS0) 112, OS1 114, OS2 116, Coupling Facility (CF0) 118, CF1 120 in System 1 102 and OS0 122, OS1 124, OS2 126, CF0 128, CF1 130 in System 2 104. Messages are exchanged using facilities located in the channels 106, 108 called buffer sets. Multiple buffer sets allow multiple messages to be exchanged simultaneously. In the present embodiment, 32 buffer sets are provided.

Figure 2A:
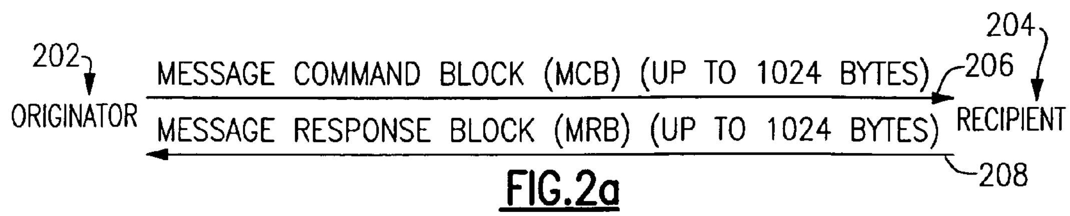
FIG. 2 (2*a*, 2*b*, 2*c*) illustrate the sequences of message exchanges over the link between two systems.

FIG. 2 shows the sequences of three different kinds of messages. FIG. 2*a* is the 'no data' case where the originator 202 sends a Message Command Block (MCB) 206 to the recipient 204. The recipient 204 responds with a Message Response Block (MRB) 208 sent back to the originator 202.

Figure 2B:
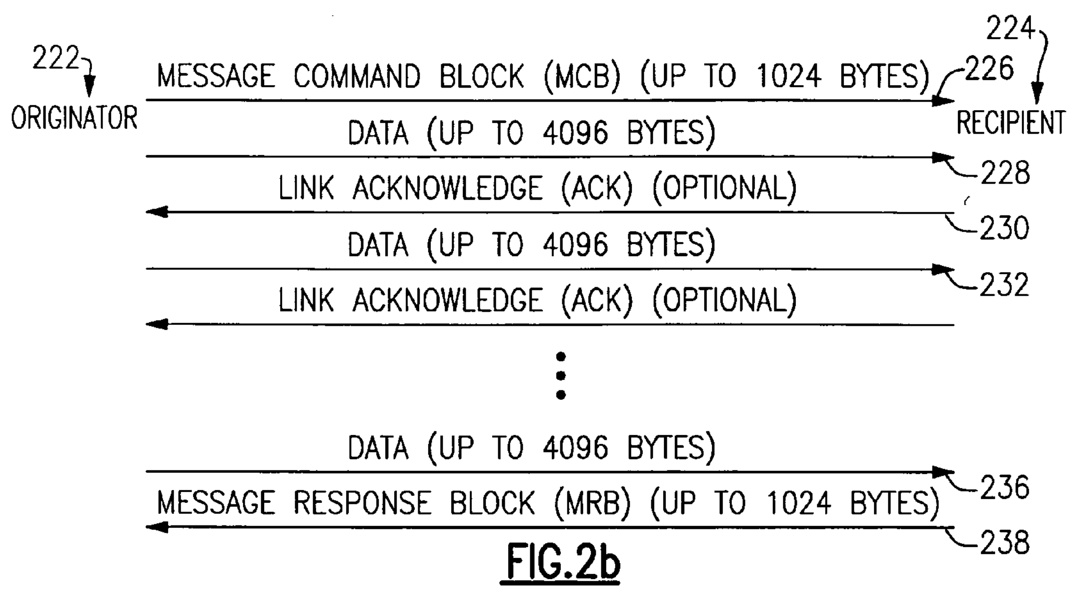

FIG. 2*b* is the write case where the originator 222 sends DATA to the recipient 224. Following the MCB 226, the originator 222 sends the first Data message area 228 to the recipient 224. If data area message buffer space is limited at the recipient, not all of the message data can be sent in one data area. Flow control is realized through the Link Acknowledge (ACK) 230 sent by the recipient back to the originator 222 when buffer space becomes available. The originator 222 responds by sending the next data area 232 to the recipient. It should be understood that this acknowledgment process can be repeated many times depending on the number of data areas transferred. After the last Data area 236 is received, the recipient 224 sends the MRB 238 back to the originator 222.

Figure 2C:
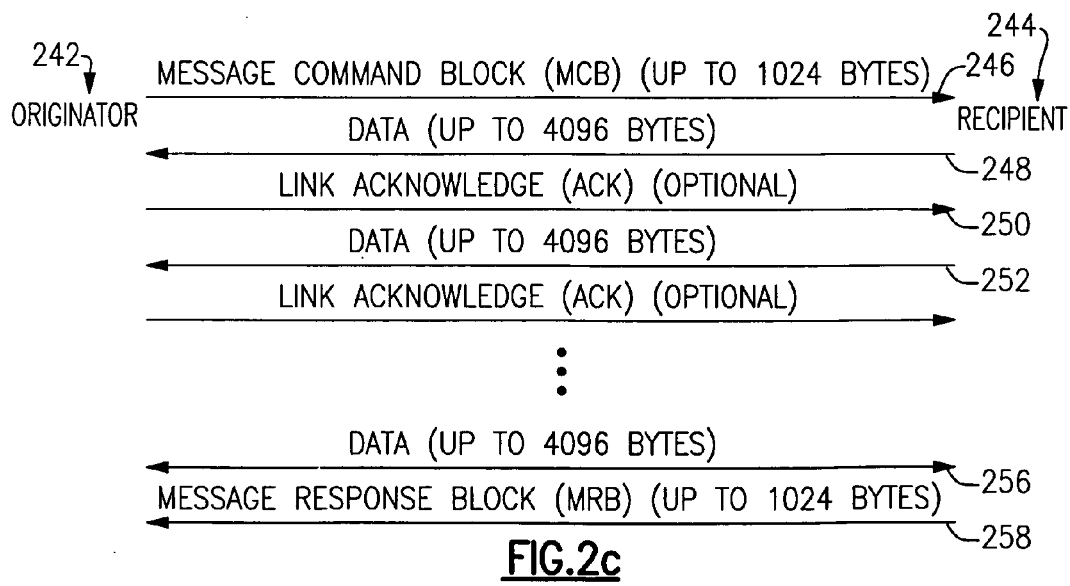

FIG. 2*c* is the read case where the originator 242 receives DATA from the recipient 244. Following the MCB 246, the recipient 244 sends the first Data area 248 back to the originator 24. If data area buffer space is limited at the originator, not all of the message data can be sent in one data area. Flow control is realized through the Link Acknowledge (ACK) 250 sent by the originator back to the recipient 244 when buffer space becomes available. The recipient 244 responds by sending the next data area 252 to the originator. It should be understood that this acknowledgment process can be repeated many times depending on the number of data areas transferred. After the last Data area 256 is sent, the recipient 244 sends the MRB 258 back to the originator 242.

FIG. 2 also shows the link traffic characteristics. In ISC, frames may have payloads up to 4096 bytes while in ICB, packets are limited to 128 bytes (the memory line size of the machine). Even though packets are only 128 bytes, they are transmitted in bursts resembling the ISC frame sizes shown in FIG. 2.

For each of the 32 buffer sets MCBs 206, 226, 246 may have a variable payload up to 1024 bytes. The Data in FIGS. 2*b* and 2*c* is divided into multiple frames when the data area is greater than 4096 bytes. For example, 64K bytes of optional data is transmitted in 16 frames, each with 4096 byte payloads. In prior ISCs, a link acknowledgment between each data frame is required. In the present invention, 64K byte link buffers allow the transmission of up to 16 frames, each with 4096 byte payloads to be transmitted without any link acknowledgments.

Figure 3:
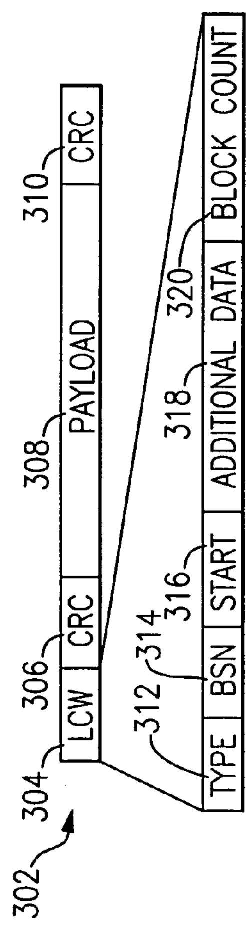
FIG. 3 illustrates the structure of the message frames.

FIG. 3 shows the format of the frames used to exchange MCBs, Data, MRBs, and ACKs over the link. Each frame 302 starts with a Link Control Word (LCW) 304 followed by a Cyclic Redundancy Code (CRC) 306 protecting the LCW. Next is the payload 308 which consists of anywhere from zero to 4096 bytes; ACKs have no payload. If there is a payload 308, it is protected by a second Cyclic Redundancy Code (CRC) 310. The LCW 304 is shown in more detail. It comprises a type field 312 that specifies the frame as an MCB, Data, MRB, ACK, or other frame. The buffer set number (BSN) field 314 identifies the particular message facilities used to exchange this particular message. It should be understood that multiple messages may be multiplexed together over a single link. The BSN field keeps track of which message the frame belongs to. The start bit 316 indicates that this is the first frame of a message area. The additional data bit 318 (A bit) indicates several different things. In an MCB it indicates that there is a least one Data area to follow (the write case), in an MRB it indicates that there was at least one Data area preceding the MRB (the read case), and in a Data frame it indicates that there is another Data area to follow and that an ACK is required to proceed to the next Data area. The A bit is only valid when the start bit is set to one. The block count 320 specifies the number of 256 byte blocks in the message area. It does not specify the length of the current frame, but specifies the total number of all of the frames for this message area. The block count 320 is only valid when the start bit is set to one.

Figure 4:
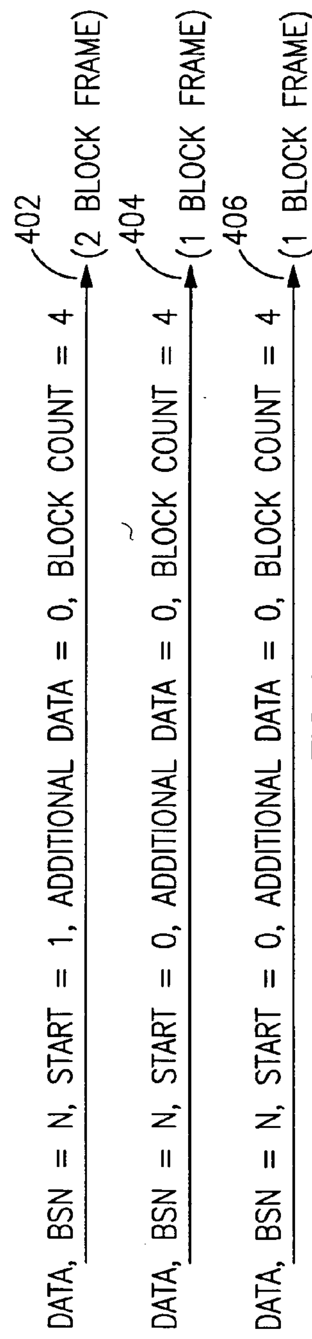
FIG. 4 illustrates how a message area can be segmented into more than one frame.

Frames can be suspended on any 256 byte boundary for two reasons. First, the transmitter may temporarily run out of data to be sent because of main memory access delays. Second, and more importantly for this invention, the frames may be suspended to allow higher priority frames to be interleaved. FIG. 4 shows how a message area can be segmented into multiple frames. Message areas can be divided into any number of frames, but each frame must be an even multiple of 256 byte blocks. In this example, a Data area of 1024 bytes is divided into three frames. The first frame 402 of the Data area has the start bit set to one, and the block count is 4. This frame is two blocks long (512 bytes), so the receiver knows that two more blocks are coming. The second frame 404 has the start bit set to zero, so the receiver knows that this is a continuation of a previous message area. This frame is one block long (256 bytes). The third frame 406 also has the start bit set to zero, and it is one block long. The receiver knows that this frame will complete the block count specified in the first frame 402.

The link acknowledgment (ACK) frames are very short and have no payload. They have only an LCW and CRC.

Figure 5:
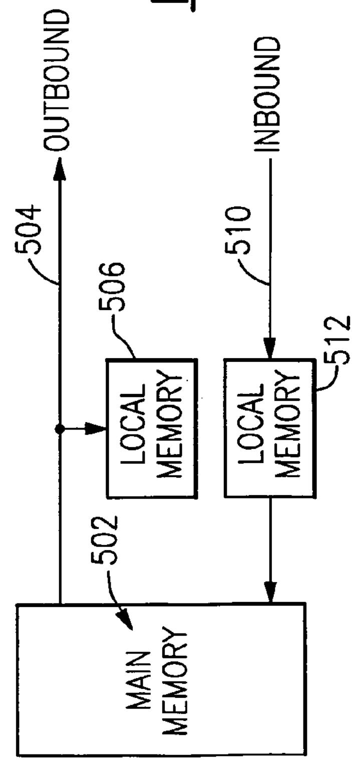
FIG. 5 illustrates the channel buffering.

FIG. 5 illustrates the frame buffering used in the channels. In the outbound direction, data is fetched from main memory 502 and sent over the outbound link 504. The scheduler is used to determine the order in which frames are sent. The local memory 506 is used to keep a copy of frames sent over the link for later retransmission during recovery operations. On the inbound link 510, all frames are stored in the local memory 512 as they are received. A second scheduler determines the order in which the inbound frames are moved from the local memory 512 to main memory 502. While two schedulers are provided in each channel, this embodiment concentrates on the operation of the outbound frame scheduler used for transmission of frames.

Frames and packets are grouped into three priority levels. Data frames have the lowest priority. This is because data frames take a relatively long time to transmit and the low priority is tolerated by the software. The software is aware of the longer latencies when transferring optional data, so it transfers these messages asynchronously. In this case, the processor can start the message and continue to execute instructions while the data transfer is in progress. When the message finishes, the processor detects completion and returns to the instruction stream that sent the message.

MCBs and MRBs have the middle priority. These frames are typically much shorter (less than 256 bytes) than the data frames, and software executes messages that contain only MCBs and MRBs (no optional data as shown in FIG. 2*a*) synchronously. Because of the low latencies associated with frames having only MCBs and MRBs, it takes more time for the software to switch tasks than the time for the message exchange. So, the software instruction execution simply stops until the message completes.

The link acknowledgments (ACKs) and other LCW only frames used for various recovery and initialization procedures have the highest priority. In reality, since these frames are mostly used for long data transfer messages, they could have a lower priority. However, since they are so short (LCW only), and because it is relatively difficult to have hardware state machines to queue them behind other traffic, the practical solution is to transmit them as soon as possible.

When multiple buffer sets have outbound frames to transmit, frames from the buffer sets are interleaved and a modified round robin technique is used to control order. The rules can be summarized by the following statements:

1) All MCBs and MRBs are transmitted in their entirety as a single frame if data (the payload) is available from main memory. These frames can have payload up to 1024 bytes. If data from main memory is temporarily not available, the MCBs and MRBs may be segmented into smaller frames (with payloads in multiples of 256 bytes). In this case, if another active buffer set has something to send, that buffer set starts to transmit.

2) The maximum payload for a Data frame is 4096 bytes, and up to 64K bytes may be transferred without link acknowledgment. In other words, 64K of data requires transmitting 16 frames, each with 4096 byte payloads.

3) All Data message areas (up to 4096 byte payloads) are transmitted in their entirety as a single frame if data (the payload) is available from main memory. If data from main memory is temporarily not available, the data frames may be segmented into smaller frames (with payloads in multiples of 256 bytes). In this case, if another active buffer set has something to send, that buffer set starts to transmit.

4) If multiple buffer sets have data areas to transmit, transmission is for a particular buffer set is suspended on 1024, 2048, or 4096 byte (programmable) boundaries.

The channel hardware uses a modified round robin frame scheduling algorithm. When the transmission of a frame ends, either because it has completed or payload data from main memory is temporarily not available, and if at least one other buffer set is active (wanting to transmit a frame), frame transmission switches to another buffer set. When multiple buffer sets are active, a combination round-robin and first-come-first-served algorithm determines the next frame to transmit.

In addition, the transmission alternates between sending either MCBs or MRBs and Data areas, if at least one of each is active. Also, this ping-pong effect can be programmed to give more priority to MCBs and MRBs by allowing some number of MCBs and MRBs (N) to be transmitted for each Data frame transmitted.

Strict round robin schemes use an index to keep track of the current buffer set being transmitted. As buffer sets become active, a bit is set for each MCB/MRB and Data area of each buffer set. When frame transmission ends, combinatorial logic compares the index of the last frame transmitted to the active bits looking for the next sequential buffer set and frame type to transmit. With 32 buffer sets, this logic has 32+32+6=70 bits of input, leading to considerable circuit counts.

By taking advantage of the minimum time it takes to transmit a frame, the high speed complex combinatorial logic described above can be avoided. In this scheme, frames are transmitted on a first-come-first-served basis until multiple buffer sets become active at the same time and need to transmit a frame. Each time frame transmission starts and multiple buffer sets are active, a search algorithm is used to scan the active buffer sets to determine the next frame to send.

Figure 6:
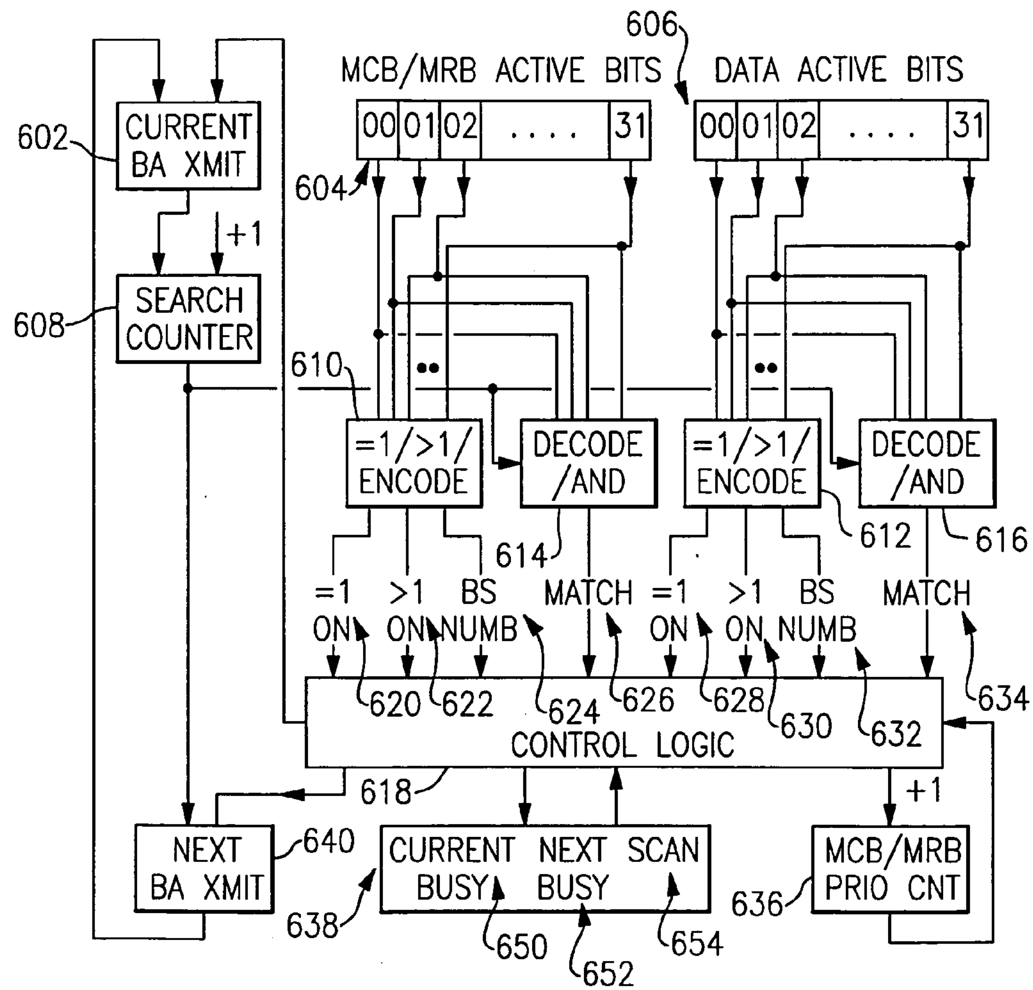
FIG. 6 illustrates the details of the priority hardware structure.

FIG. 6 shows the hardware structure. The CURRENT BA (Buffer Area) XMIT register 602 is 6 bits and points to the buffer area currently being transmitted. The MCB/MRB ACTIVE BITS 604 and DATA ACTIVE BITS 606 are set when the buffer area becomes active (driven by processor instructions), and frame transmission is required. These bits are reset when the buffer area no longer has frames to be transmitted. The SEARCH COUNTER 608 is 5 bits and scans the ACTIVE bits 604, 606 to determine the next buffer area to transmit. Each of the two ACTIVE bits registers drives an =1/>1/ENCODE 610, 612 and a DECODE/AND 614, 616 circuit. Each =1/>1/ENCODE has three outputs 620, 622, 624 and 628, 630, 632. The =1 outputs 620, 628 indicate that exactly one ACTIVE bit 604, 606 is on, the >1 outputs 622, 630 indicate that more than one ACTIVE bit is on, and the ENCODE outputs 624, 632 are 5 bits and point to an ACTIVE bit and is only valid when the =1 outputs 620, 628 are active. The DECODE/AND circuits 614, 616 decode the 5 bit SEARCH COUNTER 608 and logically ANDs the decoder outputs with the ACTIVE bits 604, 606. The outputs of 32 AND circuits are then logically ORed to create lines called MATCH 626, 634 indicating that the SEARCH COUNTER 608 is pointing to an active buffer area. The NEXT BA (Buffer Area) XMIT register 640 is 6 bits and points to the next buffer area to be transmitted. It is loaded from either the CONTROL LOGIC 618 or from the SEARCH COUNTER 602. The MCB/MRB PRIO CNT register 636 is 4 bits and gives priority to the MCBs and MRBs over the DATA areas by allowing multiple MCBs and MRBs to be transmitted before allowing a DATA frame to be transmitted.

There are four operational cases of the hardware in FIG. 6. The first case of is when the transmitter is idle as indicated by the CURRENT BUSY bit 650 being in the reset state; no frames are being transmitted. As soon as a buffer area becomes active, the corresponding bit in one of the ACTIVE BITS registers 604, 606 is set. The CONTROL LOGIC 618 sees a =1 signal 620, 628 and uses the corresponding ENCODE output 624, 632 to set the CURRENT BA XMIT register 602. The high order bit of this register points to either an MCB/MRB area or a DATA area. The ACTIVE BITS register 604, 606 bit is reset, and the CURRENT BUSY bit 650 is set to indicate that the transmitter is now busy sending a frame. When the frame finishes and no other ACTIVE BITS 604, 606 are set, the CURRENT BUSY bit 650 is reset.

The second case occurs when the CURRENT BUSY bit 650 is set while an ACTIVE BIT 604, 606 is set. In this case, the CONTROL LOGIC 618 sees a =1 signal 620, 628 and uses an ENCODE output 624, 632 to set the NEXT BA XMIT register 640. The high order bit of this register points to either an MCB/MRB area or a DATA area. The ACTIVE BITS register 604, 606 bit is reset, and the NEXT BUSY 652 bit is set to indicate that another buffer area is in the queue waiting for transmission. At the end of the current frame transmission, the value of the NEXT BA XMIT 640 is set into the CURRENT BA XMIT 602 register, and the next frame begins transmission. The NEXT BUSY bit 652 is also reset.

The third case is when both the CURRENT BUSY 650 and NEXT BUSY 652 bits are on and an ACTIVE BITS register 604, 606 bit is set. In this case, the CONTROL LOGIC 618 does nothing and waits until the end of the current frame transmission. If at that time there is still one and only one ACTIVE BITS register 604, 606 bit set, the CONTROL LOGIC 618 uses an ENCODE output 624, 632 to update NEXT BA XMIT register 640 at the same time that it updates the CURRENT BA XMIT register 602 with the present content on the NEXT BA XMIT register 640.

The forth and last case is at the end of frame transmission when the CURRENT BUSY 650 and NEXT BUSY 652 bits are both set, and more than one of the ACTIVE BITS register 604, 606 bits is on. This condition starts the scanning process. At the beginning of the next frame transmission, there is sufficient time to scan, cycle by cycle, each ACTIVE BITS register 604, 606 bit to determine if it will be the next buffer area to transmit. First, the NEXT BA XMIT register 640 is loaded into the CURRENT BA XMIT register 602, the SCAN bit 654 is set, and the NEXT BUSY bit 652 is reset. Next, the content of the CURRENT BA XMIT register 602 is loaded into the SEARCH COUNTER 608, and this counter is incremented by one. The CONTROL LOGIC 618 then examines the output of the DECODE/AND functions 626, 634 to see if there is a match. If there is no match, the SEARCH COUNTER 608 is again incremented and the search continues. If there is a match, the value on the SEARCH COUNTER 608 is loaded into the NEXT BA XMIT register 640, the NEXT BUSY bit 652 is set, and the SCAN bit 654 is reset.

The scanning process only starts at the beginning of frame transmission. Since it takes more time to transmit even the smallest frame than it takes to scan all of the ACTIVE BITS register 604, 606 bits, the link is never idle if there are any frames to transmit.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A scheduling method for scheduling the transmission of message frames and packets among coupled computer systems of a complex computer system for sending messages between said coupled computer systems, comprising the steps of operating a scheduler which:

recognizes priorities of different kinds of messages presented to the scheduler;

processes the different kinds of messages presented with fairness within a priority; and guarantees a forward progress of all message buffer sets, wherein said scheduler comprises:

a group of active bits that keeps track of which message buffer areas have something to send;

a pointer to a current message buffer area being transmitted;

a pointer to a next message buffer area to be transmitted;

a scan pointer to sequentially look at each of said active bits; and control logic to operate the scan pointer and counter.

2. The method as recited in claim 1, wherein said scheduler operates sequentially during message transmission and in parallel to transmission.

* * * * *